United States Patent

Matsumura et al.

[11] Patent Number: 5,272,185
[45] Date of Patent: Dec. 21, 1993

[54] POLYPHENYLENESULFIDE COMPOSITION FOR POWDER COATING

[75] Inventors: Toyohiro Matsumura; Kazuyuki Morita, both of Hiratsuka, Japan

[73] Assignee: The Furukawa Electric Co., Ltd., Tokyo, Japan

[21] Appl. No.: 781,845

[22] Filed: Oct. 24, 1991

[30] Foreign Application Priority Data

Oct. 26, 1990 [JP] Japan .................. 2-289763

[51] Int. Cl.$^5$ ............................ C08K 9/06
[52] U.S. Cl. .................. 523/212; 524/430; 524/609
[58] Field of Search ........ 523/212; 524/430, 609

[56] References Cited

U.S. PATENT DOCUMENTS

| | | |
|---|---|---|
| 3,622,376 | 11/1971 | Tieszen et al. . |
| 3,634,125 | 1/1972 | Tieszen . |
| 3,868,338 | 2/1975 | Parsons, III et al. ............. 524/39 |
| 4,183,840 | 1/1980 | Takahashi et al. . |
| 4,247,598 | 1/1981 | Blackwell . |
| 4,267,300 | 5/1981 | Guilbert . |
| 4,835,051 | 5/1989 | Yu . |
| 4,904,502 | 2/1990 | Kallenbach et al. . |
| 5,015,686 | 5/1991 | Kallenbach et al. . |
| 5,021,497 | 6/1991 | Ohara et al. ............. 523/212 |

FOREIGN PATENT DOCUMENTS 56-118468 9/1981 Japan .
59-193970 11/1984 Japan .
62-230820 10/1987 Japan .

*Primary Examiner*—John C. Bleutge
*Assistant Examiner*—Mark D. Sweet
*Attorney, Agent, or Firm*—Birch, Stewart, Kolasch & Birch

[57] ABSTRACT

A polyphenylenesulfide composition for powder coating is disclosed. The composition comprises polyphenylenesulfide resin powder and hydrophobic silica, wherein the hydrophobic silica is added to said resin powder in the form of ultrafine particles in an amount of 0.05 to 0.6% by weight of hydrophobic silica based on the total weight of the composition, wherein the ultrafine particles have been subjected to a surface hydrophobic treatment by a silylating agent, and wherein the primary particles of ultrafine particles of the hydrophobic silica have an average diameter of 0.1 μm or less.

10 Claims, No Drawings

POLYPHENYLENESULFIDE COMPOSITION FOR POWDER COATING

FIELD OF THE INVENTION

The present invention relates to a polyphenylenesulfide composition for powder coating, and more particularly to a polyphenylenesulfide composition for powder coating that can form a coated film surface that is smooth, uniform, and free from cissing.

BACKGROUND OF THE INVENTION

Since polyphenylenesulfides having

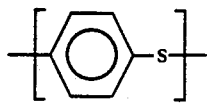

as basic units are excellent in properties, such as heat resistance, water resistance, chemical resistance, abrasion resistance, and electrical insulation, coatings containing polyphenylenesulfide as a base are used in the fields of rust prevention and corrosion protection of metals and electrical insulation work.

A coating containing polyphenylenesulfide as a base is generally applied in such a way that the coating is applied to the surface of an object in the form of a powder or slurry, and is heated to melt to form a coated film, or in such a way that the coating is sprayed in the form of a powder onto the surface of a preheated object to form a coated film. This is because polyphenylenesulfides do not dissolve in any organic solvent.

However, if a powder of polyphenylenesulfide is applied by using, for example, electrostatic spray coating, fluidized bed coating, or flame spray coating, which are usual methods of powder coating, a cissing formation phenomenon (a phenomenon wherein spots form discontinuous parts, or cratering, on the surface of coated film by the repellence of the coating composition) appears on the surface of the film when the powder is heated and melted. In many cases the cissing remains after curing and cooling, which makes it very difficult to form a uniform and smooth coated film.

The phenomenon not only injures the appearance of the film, but also causes pinholes, which greatly restricts the application of the coating. Therefore techniques for solving these problems are desired.

Despite the fact that the properties of polyphenylenesulfide coatings are excellent, the use of a coating containing polyphenylenesulfide as a base is extremely restricted for powder coating.

In order to prevent the cissing phenomenon, which occurs in the coating film when a polyphenylenesulfide composition is applied, an addition of metal oxide such as titanium dioxide to the composition was disclosed (e.g., Japanese Patent Publication No. 38689/1974 and Japanese Patent Application (OPI) No. 234067/1988). However, according to the inventor's tests the addition of the metal oxide for the prevention of cissing in the film is insufficient in such polyphenylenesulfide coatings.

As the cissing preventive agent, for example, acrylate polymers or copolymers, such as polyethyl acrylates, polybutyl acrylates, and poly-2-ethylhexyl acrylates, and fluorine-type surface-active agents, such as fluorinated alkyl esters, are widely used in conventional coatings. For example, Japanese Patent Application (OPI) No. 118468/1981 describes that a certain surface-active agent can be used for the prevention of cissing of epoxy resin powder coatings, and Japanese Patent Application (OPI) No. 193970/1984 describes that the addition of an acrylic oligomer, i.e., Modaflow (trade name, manufactured by Monsato Chemical Company, U.S.A.), to epoxy resin-type powder coatings is effective in the prevention of cissing.

In order to develop a polyphenylenesulfide composition for powder coating, the inventors first tried to apply several kinds of polyphenylenesulfide resin powders having different formulations onto metal plates by the usual powder coating technique.

As a result, a number of cissing formations occurred on the coating surface. Therefore, to prevent the cissing formation, known cissing preventive agents as described above were studied in regard to the kind and the amount to be added, which varies widely. However, it was found that the conventional general-purpose known cissing preventive agents for powder coating could not prevent cissing formation in the case of polyphenylenesulfide resin powders.

Cissing formation that occur in the coating surface during powder coating of a polyphenylenesulfide resin powder are, for example, due to the action of cohesion that is characteristic of polyphenylenesulfide resins, which takes place at the time of heating and melting after the application. The presence of such cissing adversely affects the long-term durability of the coating to a considerable extent.

The surface of a coating film obtained by powder coating a polyphenylenesulfide composition becomes orange-peel-like. Therefore, it is found that the smoothness of the coating film is insufficient when particularly fine smoothness is required.

SUMMARY OF THE INVENTION

The object of the present invention is to provide a polyphenylenesulfide composition for powder coating that resolves the above problems associated with the use of polyphenylenesulfide in powder coating, that does not cause cissing formations, and that can produce a smooth and uniform film.

Other and further objects, features, and advantages of the invention will be apparent from the following description.

DETAILED DESCRIPTION OF THE INVENTION

In the development of a polyphenylenesulfide composition, the inventors have keenly studied the prevention of cissing formations that occur on the coating surface when a polyphenylenesulfide resin powder is applied by powder coating, and have found that, the addition of a specified hydrophobic silica, i.e., a hydrophobic silica in the form of ultrafine particles whose surfaces have been made hydrophobic by treatment with a silylating agent, and whose average diameter of the primary particles is 0.1 $\mu$m or less, in an amount of 0.05 to 0.6% by weight, to a polyphenylenesulfide composition, is quite effective.

That is, the present invention provides:

(1) a polyphenylenesulfide composition for powder coating which comprises a polyphenylenesulfide resin powder and hydrophobic silica, the hydrophobic silica being added to said resin powder in the form of ultrafine particles in an amount of 0.05 to 0.6% by weight, the ultrafine particles having been subjected to a surface hydrophobic treatment by a silylating agent, and the primary particles of the ultrafine particles of hydrophobic silica having an average diameter of 0.1 μm or less; and (2) a polyphenylenesulfide composition for powder coating as described above in (1), characterized in that aluminum oxide in the form of ultrafine particles, the primary particles of the ultrafine particles of aluminum oxide having an average diameter of 0.1 μm or less, is further added in such a proportion:

$$\frac{\text{weight of aluminum oxide}}{\text{weight of hydrophobic silica}} \leq 2.00.$$

The polyphenylenesulfide resin powder that is the base of the present composition is a compound made up of repeating units represented by

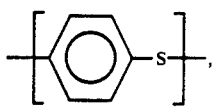

which may include partially oxidized, branched, or crosslinked products. The particle diameter of the polyphenylenesulfide powder is 200 μm or less, preferably 150 μm or less, so that the composition may be suitable for electrostatic spray coating, fluidized bed coating, and flame spray coating, etc. Polyphenylenesulfide power having an average particle diameter in the range from 30 to 80 μm are most preferable.

The second essential component in the present composition is a hydrophobic silica in the form of ultrafine particles selected from a specifically limited group. The hydrophobic silica in the form of ultrafine particles is obtained by subjecting silica ultrafine particles, wherein the average diameter of the primary particles is 0.1 μm or less, and preferably 0.005 to 0.050 μm, to a surface treatment with a silylating agent, so that hydrophilic silanol groups present on the surfaces of the silica particles are masked and the silica ultrafine particles are made hydrophobic.

The average diameter of the primary particles of the ultrafine particles of the hydrophobic silica is required to be 0.1 μm or less. If the average diameter exceeds 0.1 μm, the dispersed density of the hydrophobic silica in the composition decreases, thereby considerably lowering the cissing formation preventive effects, and hence the object of the present invention cannot be attained. More preferably, the primary particles of the ultrafine powder have an average diameter of 0.005 to 0.050 μm.

It is also important that the surface of the hydrophobic silica in the form of ultrafine particles be made hydrophobic by treatment with a silylating agent. The silylating agent is a silane compound that replaces polar reactive groups (i.e., active hydrogen), such as alcohol groups and amino groups in inorganic compounds or organic compounds, with organosilicon groups, in order to, for example, stabilize the reactivity and make surfaces hydrophobic. Examples of such silane compounds are chlorosilanes, such as dimethyldichlorosilane, trimethylchlorosilane, and n-butyldimethylchlorosilane; silazanes, such as octamethylcyclotetrasilazane and hexamethyldisilazane; and alkoxysilanes, such as methyltrimethoxysilane and octyltrimethoxysilane; wherein the silylating agents can be suitably used in the manufacture of the above hydrophobic silica in the form of ultrafine particles.

With regard to the hydrophobic silica, for example, Japanese Patent Application (OPI) No. 230820/1987 describes that, in order to improve the humidity resistance and water resistance of liquid epoxy resin coatings, the addition of a hydrophobic silica having a particle diameter of 13 to 40 μm is effective. Japanese Patent Application (OPI) No. 57858/1981 describes that, in order to improve the fluidity of a powder of epoxy resin powder coatings, the addition of a hydrophobic silica is effective. However, the composition of the present invention differs in the resin that is utilized and also in the actions and effects of the composition.

It is very surprising that the above specified hydrophobic silica is quite effective in solving the difficult problem of preventing cissing formation that occur when a polyphenylenesulfide resin powder is applied by powder coating, which is not prevented by using cissing preventive agents conventionally known in the field of powder coatings.

The hydrophobic silica in the form of ultrafine particles utilized in the present invention and that have been made hydrophobic by treatment with a silylating agent, include those that are commercially available, for example, Aerosil R-805 (trade name, manufactured by Degussa Co.), which is a hydrophobic silica in the form of ultrafine particles that have been made hydrophobic by treatment with a functional silylating agent containing an octyl group, Aerosil R-974 and Aerosil R-972 (trade names, manufactured by Nippon Aerosil Co., Ltd.), which are hydrophobic silicas in the form of ultrafine particles that have been made hydrophobic by treatment with a functional silylating agent containing a dimethyl group, and Aerosil R-812 (trade name, manufactured by Degussa Co.), which is a hydrophobic silica in the form of ultrafine particles that have been made hydrophobic by treatment with a functional silylating agent containing a trimethyl group.

The hydrophobic silica is added in an amount of 0.05 to 0.6% by weight based on the whole composition. If the amount to be added is less than 0.05% by weight, the effect of suppressing cissing formation at the time of application is considerably lowered, whereas if the amount to be added is greater than 0.6% by weight, the smoothness of the coating formed on an object is injured. A preferable amount to be added is 0.1 to 0.5% by weight.

When a coating film having an excellent smoothness is needed, in addition to the above hydrophobic silica, aluminum oxide in the form of ultrafine particles, the primary particles of the ultrafine particles of the aluminum oxide having an average diameter of 0.1 μm or less, preferably 0.005 to 0.05 μm, is used in the polyphenylenesulfide composition. As the aluminum oxide in the form of ultrafine particles, for example, Aluminum Oxide C (trade name, manufactured by Degussa Co.) can be used.

The amount of the aluminum oxide in the form of ultrafine particles to be added to the hydrophobic silica is desirably such that:

$$\frac{\text{Weight of aluminum oxide}}{\text{Weight of hydrophobic silica}} \leq 2.00.$$

It is not preferable that the amount of the aluminum oxide to be added be greater than the above proportion, because the effect of the addition of the hydrophobic silica decreases and cissing formation is liable to occur on the coating surface. A more preferable proportion is $$\frac{\text{Weight of aluminum oxide}}{\text{Weight of hydrophobic silica}} \leq 1.8.$$

The present composition can be manufactured easily by mixing uniformly with a stirring apparatus, such as a Henschel mixer.

If necessary, other additives, for example a color pigment such as titanium dioxide, red iron oxide, and carbon black; an inorganic filler such as glass beads, glass powder, glass short fibers, glass flakes, talc, calcium carbonate, and barium sulfate; an ultraviolet stabilizer; and a rust preventive agent may be added in suitable amounts to be mixed with the composition; also other polymers, such as polyamides, polycarbonates, polysulfones, polyethersulfones, polyphenyleneoxides, polyimides, polyamidoimides, and epoxy resins may be mixed uniformly. In the present invention, conventional constituents for powder coating can be also added optionally.

The present composition is applied to the surface of an object, for example, a metal, glass, or ceramic object by the usual powder coating method, and is then heated at a temperature of 300° to 400° C. for a prescribed period to form a film. Prior to powder coating, a suitable primer may be applied to the surface of the object.

When the present composition is used for powder coating, cissing formations do not occur at the time of application and a smooth coating can be formed.

Further, since the base is polyphenylenesulfide, the film is excellent in heat resistance, water resistance, chemical resistance, abrasion resistance, and electrical insulation, and the formation of the coating at places where these properties are required is useful. In particular, application of the composition, for example, to electrical insulating coatings on heat resistant/chemical resistant precoated plates and electric and electronic components, and to heat resistant/chemical resistant/corrosion preventive coatings of auto parts, chemical plants, hot water supply pipes, hot spring pipings, pipings of ships and sea water plants, and pipes for oil fields, is useful.

Now the present invention will be described in more detail in accordance with examples, but the invention is not limited by them.

EXAMPLES 1 TO 13 AND COMPARATIVE EXAMPLES 1 TO 11

Components whose compositions are shown in Table 1 are uniformly mixed by a Henschel mixer to prepare polyphenylenesulfide compositions of Examples 1 to 13. For comparison, polyphenylenesulfide compositions having compositions as shown in Table 2 are prepared, which were referred to as Comparative Examples 1 to 11.

TABLE 1

| | Example No. | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Composition (in weight parts) | | | | | | | | | | | | | |
| Polyphenylene-sulfide[*1] (powder) | 100 | 100 | 100 | 100 | 100 | 100 | 100 | 100 | 100 | 100 | 100 | 100 | 100 |
| Hydrophobic silica[*2] (fine particle) | 0.1 | 0.15 | — | 0.15 | — | 0.3 | 0.5 | — | — | — | — | 0.5 | — |
| Hydrophobic silica[*3] (fine particle) | — | — | 0.15 | — | 0.2 | — | — | — | — | 0.6 | — | — | — |
| Hydrophobic silica[*4] (fine particle) | — | — | — | — | — | — | — | 0.5 | — | — | 0.3 | — | 0.6 |
| Hydrophobic silica[*5] (fine particle) | — | — | — | — | — | — | — | — | 0.5 | — | — | — | — |
| Silica[*6] (fine particle) | — | — | — | — | — | — | — | — | — | — | — | — | — |
| Modaflow[*7] | — | — | — | — | — | — | — | — | — | — | — | — | — |
| Aluminum oxide[*8] (fine particle) | — | — | — | — | — | — | — | — | — | — | 0.5 | 0.5 | 0.5 |
| Glass fiber[*9] (short fiber) | — | — | — | 20 | 20 | 20 | 20 | 20 | 20 | 15 | 20 | 30 | 40 |
| Red iron oxide | — | — | — | 2 | 2 | — | — | 1 | 1 | — | 2 | — | — |
| Titanium dioxide | — | — | — | — | — | 10 | 10 | 5 | 5 | 15 | — | 5 | 5 |
| Total (weight parts) | 100.1 | 100.15 | 100.15 | 122.15 | 122.2 | 130.3 | 130.5 | 126.5 | 126.5 | 130.6 | 122.5 | 136.0 | 146.1 |
| Proportion of hydrophobic silica fine particle (wt. %) | 0.1 | 0.15 | 0.15 | 0.12 | 0.16 | 0.23 | 0.38 | 0.40 | 0.40 | 0.46 | 0.24 | 0.37 | 0.41 |
| Weight ratio of aluminum oxide/ hydrophobic silica | 0 | 0 | 0 | 0 | 0 | 0 | 0 | 0 | 0 | 0 | 1.67 | 1.00 | 0.83 |

TABLE 2

| | Comparative Example No. | | | | | | | | | | |
|---|---|---|---|---|---|---|---|---|---|---|---|
| | 1 | 2 | 3 | 4 | 5 | 6 | 7 | 8 | 9 | 10 | 11 |
| Composition (in weight parts) | | | | | | | | | | | |
| Polyphenylene-sulfide[*1] (powder) | 100 | 100 | 100 | 100 | 100 | 100 | 100 | 100 | 100 | 100 | 100 |
| Hydrophobic silica[*2] (fine particle) | — | 0.03 | — | — | 0.85 | — | — | — | — | — | — |
| Hydrophobic silica[*3] | — | — | — | — | — | — | — | — | — | — | — |

TABLE 2-continued

| | Comparative Example No. | | | | | | | | | | |
|---|---|---|---|---|---|---|---|---|---|---|---|
| | 1 | 2 | 3 | 4 | 5 | 6 | 7 | 8 | 9 | 10 | 11 |
| (fine particle) Hydrophobic silica*4 (fine particle) | — | — | — | — | — | — | — | — | — | — | 0.5 |
| Hydrophobic silica*5 (fine particle) | — | — | — | — | — | — | — | — | — | — | — |
| Silica*6 (fine particle) | — | — | — | — | — | 0.1 | 0.2 | — | — | — | — |
| Modaflow*7 | — | — | — | — | — | — | — | 0.5 | 1.0 | — | — |
| Aluminum oxide*8 (fine particle) | — | — | — | — | — | — | — | — | — | 0.5 | 1.2 |
| Glass fiber*9 (short fiber) | — | — | 20 | 20 | 20 | — | — | 20 | 20 | 40 | 40 |
| Red iron oxide | — | — | 2 | — | — | — | — | 2 | 2 | — | — |
| Titanium dioxide | — | — | — | 10 | 10 | — | — | — | — | 5 | 5 |
| Total (weight parts) | 100 | 100.03 | 122 | 130 | 130.85 | 100.1 | 100.2 | 122.5 | 123 | 145.5 | 146.7 |
| Proportion of hydrophobic silica fine particle (wt/%) | — | 0.03 | — | — | 0.65 | — | — | — | — | — | 0.34 |
| Weight ratio of aluminum oxide/ hydrophobic silica | — | — | — | — | — | — | — | — | — | 2<< | 2.4 |

Note:
*1Trade name: Tohpren T-1 made by Tohpren Co., Ltd.
*2Trade name: Aerosil R-974, hydrophobic treated product, average diameter on primary particles: 12 mμ, made by Nippon Aerosil Co., Ltd.
*3Trade name: Aerosil R-972, hydrophobic treated product, average diameter on primary particles: 16 mμ, made by Nippon Aerosil Co., Ltd.
*4Trade name: Aerosil R-805, hydrophobic treated product, average diameter on primary particles: 12 mμ, made by Degussa Co.
*5Trade name: Aerosil R-812, hydrophobic treated product, average diameter on primary particles: 7 mμ, made by Degussa Co.
*6Trade name: Aerosil A-380, hydrophobic untreated (hydrophilic) product, average diameter on primary particles: 7 mμ, made by Nippon Aerosil Co., Ltd.
*7Acryl oligomer, made by U.S. Monsanto Co.
*8Trade name: Aluminum Oxide C, average diameter on primary particles: 13 mμ, made by Degussa Co.
*9Trade name: MICROGLAS SURFESTRAND REV9, fiber diameter: 13 ± 1.5 μm, average fiber length: 35 ± 15 μm, average aspect ratio: 2.7, made by Nippon Sheet Glass Co., Ltd.

The surfaces of stainless steel plates (SUS 304) having 0.8 mm of thickness, 150 mm of length, and 70 mm of width are degreased with trichloroethylene and are coated with the above-mentioned 24 respective compositions shown in Tables 1 and 2 by electrostatic powder coating, to form respective coatings having a thickness of 70 μm. The coatings are baked at a temperature of 340° C. for 30 min.

Hot-rolled steel plates having 5 mm of thickness, 150 mm of length, and 70 mm of width are subjected to grit blast treatment to Sa 2½ and are preheated to 340° C., and their surfaces are coated with the compositions of Examples 2 and 4 and Comparative Example 3 by electrostatic powder coating, to form respective coatings having a thickness of 200 μm, and are baked at a temperature of 340° C. for 30 min.

For these thus obtained coatings, the presence or absence of cissing and the smoothness are observed visually. The results are shown in Table 3. In Table 3, "cissing present many" means that cissings of 6 or more per a plate present, and "cissing present a little" means that cissings of 1 to 5 per a plate present.

TABLE 3

| | Film thickness (μm) | Cissing | Smoothness |
|---|---|---|---|
| Example 1 | 70 | Not present | Good |
| Example 2 | 70 | Not present | Good |
| Example 2 | 200 | Not present | Good |
| Example 3 | 70 | Not present | Good |
| Example 4 | 70 | Not present | Good |
| Example 4 | 200 | Not present | Good |
| Example 5 | 70 | Not present | Good |
| Example 6 | 70 | Not present | Good |
| Example 7 | 70 | Not present | Good |
| Example 8 | 70 | Not present | Good |
| Example 9 | 70 | Not present | Good |
| Example 10 | 70 | Not present | Good |
| Example 11 | 70 | Not present | Very good |
| Example 12 | 70 | Not present | Very good |
| Example 13 | 70 | Not present | Very good |
| Comparative example 1 | 70 | Present many | Good |
| Comparative example 2 | 70 | Present a little | Good |
| Comparative example 3 | 70 | Present many | Good |
| Comparative example 3 | 200 | Present many | Good |
| Comparative example 4 | 70 | Present many | Good |
| Comparative example 5 | 70 | Not present | Not good |
| Comparative example 6 | 70 | Present many | Good |
| Comparative example 7 | 70 | Present many | Good |
| Comparative example 8 | 70 | Present many | Good |
| Comparative example 9 | 70 | Present many | Good |
| Comparative example 10 | 70 | Present many | Very good |
| Comparative example 11 | 70 | Present a little | Very good |

From the results in Table 3, the following is apparent:
In comparative Examples 1 to 11, either the cissing phenomena preventive effect or the smoothness is not good, and thus the desired coating film having excellent in cissing formation preventive effect smoothness could not obtained. Among them, for example, Comparative Example 2 contains a hydrophobic silica, but the cissing formation preventive effect is deficient because the amount of the hydrophobic silica is insufficient. In Comparative Example 5, the smoothness of coating film is not good because an excess amount of the hydrophobic silica is added. Further, in Comparative Examples 6 and 7, the cissing formation preventive effect does not exhibit at all, since ordinary silica powder is added.

Further, in Comparative Example 10, the cissing formation is apparent owing to no addition of hydrophobic silica. In Comparative Example 11, hydrophobic silica in a prescribed amount and aluminum oxide are added, but the cissing formation could not be prevented sufficiently because too great an amount of aluminum oxide is added.

On the contrary, in Examples 1 to 13, both the cissing formation preventive effect and the smoothness of coating film are attained.

Having described our invention as related to the present embodiments, it is our intention that the invention not be limited by any of the details of the description, unless otherwise specified, but rather be construed broadly within its spirit and scope as set out in the accompanying claims.

What we claim is:

1. A polyphenylenesulfide composition for powder coating which comprises a polyphenylenesulfide resin powder and at least one hydrophobic silica, wherein the hydrophobic silica is added to said resin powder in the form of ultrafine particles in an amount of 0.05 to 0.6% by weight of hydrophobic silica based on the total weight of the composition, and wherein the ultrafine particles have been subjected to a surface hydrophobic treatment with a silylating agent, selected from the group consisting of chlorosilanes, silazanes and alkoxysilanes, and wherein the primary particles of the ultrafine particles of the hydrophobic silica have an average diameter of 0.1 $\mu$m or less.

2. The polyphenylenesulfide composition for powder coating according to claim 1, further comprising aluminum oxide in the form of ultrafine particles, wherein the primary particles of the ultrafine particle of the aluminum oxide have an average diameter of 0.1 $\mu$m or less in such a proportion:

$$\frac{\text{weight of aluminum oxide}}{\text{weight of hydrophobic silica}} \leq 2.00$$

3. The polyphenylenesulfide composition for powder coating according to claim 1, wherein the average particle diameter of polyphenylenesulfide is 200 $\mu$m or less.

4. The polyphenylsulfide composition for powder coating according to claim 1, wherein the average particle diameter of polyphenylenesulfide is 150 $\mu$m or below, and wherein the silylating agent is selected from the group consisting of dimethyldichlorosilane, trimethylchlorosilane, n-butyldimethylchlorosilane, octamethylcyclotetrasilazane, hexamethyldisilazane, methyltrimethoxysilane, and octyltrimethoxysilane.

5. The polyphenylenesulfide composition for powder coating according to claim 1, wherein the average diameter of the primary particles of hydrophobic silica is 0.005 to 0.1 $\mu$m.

6. The polyphenylenesulfide composition for powder coating according to claim 1, wherein the average diameter of the primary particles of hydrophobic silica is 0.005 to 0.050 $\mu$m.

7. The polyphenylenesulfide composition for powder coating according to claim 1, wherein the hydrophobic silica is added in an amount of 0.1 to 0.5 wt. % based on the total weight of the composition.

8. The polyphenylenesulfide composition for powder coating according to claim 2, wherein the average diameter of the primary particles of aluminum oxide is 0.005 to 0.1 $\mu$m.

9. The polyphenylenesulfide composition for powder coating according to claim 2, wherein the average diameter of the primary particles of aluminum oxide is 0.005 to 0.05 $\mu$m.

10. The polyphenylenesulfide composition for powder coating according to claim 2, wherein the aluminum ultrafine particles is added in a proportion of $$\frac{\text{weight of aluminum oxide}}{\text{weight of hydrophobic silica}} \leq 1.8.$$

* * * * *